Patented Aug. 20, 1935

2,011,579

UNITED STATES PATENT OFFICE 2,011,579

INTENSIFIED HYDROCHLORIC ACID

Sheldon B. Heath and William Fry, Midland, Mich., assignors to The Dow Chemical Company, Midland, Mich., a corporation of Michigan No Drawing. Application April 21, 1933, Serial No. 667,193

3 Claims. (Cl. 23—5)

The invention regards, as a new composition of matter, an intensified aqueous solution of hydrochloric acid.

Among the uses of ordinary hydrochloric acid solutions are the preparation of calcium-magnesium chloride from dolomite, the treatment of deep wells drilled in calcareous formation to increase the yield thereof, and the cleaning of buildings faced with limestone or dolomite. We have now found that the rate of action of the hydrochloric acid upon the rock during such uses can be increased tremendously by incorporating therewith a relatively small amount of a fluoride soluble in aqueous solutions of the acid. The invention, then, consists of the several approved mixtures of ingredients hereinafter fully described and particularly pointed out in the claims.

Among the fluorides which we have found suitable to add to the hydrochloric acid to increase the effectiveness thereof are the fluorides of sodium, potassium, ammonium, hydrogen, lithium, aluminum, and tin. We have found that the use of a relatively small amount of the fluoride in the acid gives a greater acceleration to the action than does the use of a large amount. For example, we may use up to about 20 per cent of ammonium bifluoride, and preferably between about 5 and about 10 per cent, based on the weight of hydrogen chloride in the aqueous solution, to increase the activity of the acid. The strength of aqueous hydrochloric acid in general best adapted to the uses described is between about 5 and about 20 per cent by weight of anhydrous hydrogen chloride, and preferably should be between 10 and 15 per cent.

The following example illustrates the increase in reaction rate accomplished by adding a fluoride to hydrochloric acid before treating dolomite therewith.

A piece of dolomitic rock was ground to pass a screen having 30 meshes to the linear inch and two samples of 6.00 grams each were weighed out. The analysis of the rock was: magnesium carbonate 45.8 per cent, calcium carbonate 54.1 per cent, and silicon 0.0012 per cent. The samples were placed in 100 milliliter balloon flasks and each treated with 50 milliliters of aqueous solution: one solution containing 15 per cent by weight of hydrogen chloride, and the other containing 15 per cent by weight of hydrogen chloride and 6.5 per cent by weight of ammonium bi-fluoride based on the weight of hydrogen chloride. The amount of carbon dioxide evolved in 30 minutes from the rock treated with the aqueous hydrogen chloride solution containing no fluoride was 0.172 gram. The amount of carbon dioxide evolved in 30 minutes from the rock treated with the fluoride-containing solution was 0.750 gram. Thus, the fluoride increased the reaction rate to over four times that of the acid alone.

The procedure just recited was repeated several times on various specimens with different fluorides. The results in every case showed an increase in the rate of reaction, the ammonium and sodium fluorides being particularly effective.

A particularly important use for our intensified acid is the treatment of oil, gas, etc. wells therewith to increase the yield therefrom. The use of a mineral acid, particularly hydrochloric, for such purpose has been described in United States Patent 1,877,504. The employment of a corrosion inhibitor for preventing the attack of the acid on the metal parts of the well is also described in the patent. We have used our intensified acid composition, containing a metal corrosion inhibitor such as described in the patent, in oil and gas fields where treatment with ordinary inhibited hydrochloric acid did not produce results, and obtained increases in production averaging over 300 per cent. The use of the inhibiting agent for preventing the attack of the intensified acid upon the metals with which it came into contact while being introduced into the well does not affect the accelerated rate at which it reacts with the rock.

Other modes of applying the principle of our invention may be employed instead of the one explained, change being made as regards the materials employed, provided the ingredients stated by any of the following claims or the equivalent of such stated ingredients employed.

We therefore particularly point out and distinctly claim as our invention:—

1. A composition of matter comprising hydrochloric acid, a fluoride soluble therein, and a metal corrosion inhibitor for the hydrochloric acid.

2. A composition of matter comprising aqueous hydrochloric acid, a relatively small amount of a fluoride soluble therein, and an agent capable of inhibiting the attack of the hydrochloric acid upon metals.

3. An aqueous solution containing between about 5 and about 20 per cent by weight of hydrogen chloride, a fluoride soluble in said solution in amount up to about 10 per cent by weight based on the weight of hydrogen chloride, and an agent capable of inhibiting the attack of the hydrochloric acid upon metals.

SHELDON B. HEATH.
WILLIAM FRY.